United States Patent

Muto et al.

[11] Patent Number: 5,558,032
[45] Date of Patent: Sep. 24, 1996

[54] EMBROIDERY DATA PREPARING DEVICE

[75] Inventors: Yukiyoshi Muto; Masao Futamura; Masahiro Mizuno, all of Nagoya, Japan

[73] Assignee: Brother Kogyo Kabushiki Kaisha, Nagoya, Japan

[21] Appl. No.: 493,315

[22] Filed: Jun. 21, 1995

[30] Foreign Application Priority Data

Jul. 29, 1994 [JP] Japan ................................. 6-197927

[51] Int. Cl.⁶ ............................. D05B 21/00; D05C 9/06
[52] U.S. Cl. .................................. 112/102.5; 112/470.04; 364/470.09
[58] Field of Search ............................ 112/102.5, 470.04, 112/470.06, 475.19, 475.05, 456, 458; 364/470

[56] References Cited

U.S. PATENT DOCUMENTS

| | | | |
|---|---|---|---|
| 4,499,838 | 2/1985 | Voza | 112/475.19 |
| 5,255,620 | 10/1993 | Sasano et al. | 112/470.04 X |
| 5,379,707 | 1/1995 | Asano . | |
| 5,390,126 | 2/1995 | Kongho et al. | 112/102.5 X |
| 5,390,615 | 2/1995 | Sugimoto | 112/470.04 X |

FOREIGN PATENT DOCUMENTS 4-114692   4/1992   Japan .

*Primary Examiner*—Peter Nerbun
*Attorney, Agent, or Firm*—Oliff & Berridge

[57] ABSTRACT

In an embroidery data preparing device for preparing embroidery seam data on the basis of an original picture pattern for embroidery, a plurality of desired different sizes are selected for the same pattern to be embroidered and stitch and the sizes are stored in a memory device. An original picture pattern is read out by an image scanner to obtain the original picture data and then outline data are extracted from the original picture data. The outline data are divided into a plurality of blocks, for closed areas, to obtain intermediate embroidery data. The intermediate embroidery data are enlarged or reduced at a magnifying power corresponding to each desired pattern size and embroidery seam data are obtained for each desired pattern size on the basis of the enlarged or reduced intermediate embroidery data to thereby collectively prepare the embroidery seam data for the plurality of different pattern sizes.

20 Claims, 9 Drawing Sheets

Fig.3B

| ITEM | INSTRUCTIONS |
|---|---|
| S10 | PATTERN SIZE SETTING PROCESSING |
| S11 | ORIGINAL PICTURE DATA INPUT PROCESSING |
| S12 | OUTLINE DATA PREPARING PROCESSING |
| S13 | INTERMEDIATE EMBROIDERY DATA PREPARING PROCESSING |
| S14 | MS ← VALUE OF HEAD PATTERN SIZE |
| S15 | BP ← HEAD ADDRESS OF HEAD INTERMEDIATE EMBROIDERY DATA |
| S16 | MS-ENLARGING OPERATION OF INTERMEDIATE EMBROIDERY DATA INDICATED BY BP |
| S17 | EMBROIDERY SEAM DATA PREPARING PROCESSING OF MS-ENLARGED INTERMEDIATE EMBROIDERY DATA INDICATED BY BP |
| S18 | DOES BP INDICATE FINAL INTERMEDIATE EMBROIDERY DATA ? |
| S19 | BP ← HEAD ADDRESS OF NEXT INTERMEDIATE EMBROIDERY DATA |
| S20 | IS MS FINAL PATTERN SIZE ? |
| S21 | MS ← VALUE OF NEXT PATTERN SIZE |
| S22 | MEMORY CARD ← EMBROIDERY SEAM DATA |
| S23 | EDITING PROCESSING |

EMBROIDERY DATA PREPARING DEVICE

BACKGROUND OF THE INVENTION

1. Field of the Invention

The invention relates to an embroidery data preparing device. In particular it relates to an embroidery data preparing device for collectively preparing embroidery seam (stitch) data for plural embroidery patterns of different sizes on the basis of original-picture data which are obtained by reading out an original picture pattern with an image scanner.

2. Description of Related Art

In a case where embroidery seam data, with which an original picture pattern is embroidered on an article using an industrial embroidery-sewing machine, are prepared using a conventional embroidery data preparing device, the original picture pattern having a pattern drawn thereon is read out by an image scanner connected to the embroidery data preparing device to obtain the original picture data. Then outline data of coordinate data are prepared on the basis of the original picture data thus obtained. The outline data are figure-processed to be divided into a plurality of closed areas (blocks) each of which is formed of a continuous figure, such as a triangle, a rectangle or the like, thereby obtaining intermediate embroidery data which define the plurality of blocks. Like the outline data, the intermediate embroidery data are formed of coordinate data and are stored as a file into an external storage device, such as a hard disc drive device.

The intermediate embroidery data, which are stored as a file in the hard disc drive device, are read out as the occasion demands. The intermediate embroidery data are enlarged or reduced at a magnifying power corresponding to a desired size (L, M, S or the like) of the article to be embroidered, thereby preparing enlarged (or reduced) intermediate embroidery data. The enlarged (or reduced) intermediate embroidery data are formed of coordinate data and the embroidery seam data, which comprise needle-position data of each stitch, are prepared on the basis of the intermediate embroidery data. The embroidery seam data thus prepared are transmitted to the industrial embroidery-sewing machine to perform the embroidery sewing.

When embroidery sewing is performed, plural embroidery-patterns having different sizes are generally required for even the same pattern in accordance with the portion of the article to be embroidered or the size of the article, that is, the embroidery pattern is varied in accordance with an embroidery place on the article or the article size. In the following description, embroidery patterns having different sizes means patterns which are actually embroidered on an article are different in size but identical in pattern.

For example, with respect to the embroidery place on the article, even when articles are embroidered with a pattern, the size of the embroidery pattern differs in the following cases: where the pattern is embroidered on a sleeve portion, where the pattern is embroidered on a breast pocket at a small size, where the pattern is embroidered over the whole breast portion and where the pattern is embroidered over the whole back at a large size. There are some cases where the same pattern is embroidered at plural positions on the same article and, thus, a plurality of embroidery patterns, which differ in size are required for the same pattern.

With respect to the size of the article, there are different sizes, such as L, M, and S. Accordingly, if the same pattern is required to be embroidered on articles which differ in size, the embroidery size must be varied in accordance with the size of the article. Therefore, plural embroidery patterns which are different in size are also required.

When the same pattern (based on an original picture) is embroidered at a plurality of different sizes, embroidery seam data for each size are individually required. In this case, a series of operations as described below must be repeated a number of times corresponding to the number of embroidery patterns of different sizes required. First, intermediate embroidery data for a pattern to be embroidered are read out from a hard disc drive device, and at the same time a magnifying power for enlargement or reduction of the pattern is set by an user (operator). The read-out intermediate embroidery data are enlarged or reduced on the basis of the set magnifying power to prepare enlarged (or reduced) intermediate embroidery data. On the basis of the enlarged (or reduced) intermediate embroidery data, embroidery seam data of each stitch are prepared. Therefore, there are problems that the operation of preparing the embroidery data becomes complicated and the preparation efficiency of the embroidery data is reduced.

Furthermore, like the industrial embroidery-sewing machine, a recent domestic embroidery-sewing machine allows an embroidery pattern of an original-picture pattern, drawn by an user, to be sewn on articles, such as T-shirts. The embroidery seam data on which the embroidery pattern is based are prepared by an embroidery data preparing device which is provided separately from the domestic embroidery-sewing machine. The embroidery seam data which are prepared by the embroidery data preparing device are supplied to the domestic embroidery-sewing machine by connecting the embroidery data preparing device to the domestic embroidery-sewing machine or through a storage medium, such as a flash memory card or a floppy disc. The domestic embroidery-sewing machine embroiders the embroidery pattern on the article in accordance with the supplied embroidery seam data.

On the other hand, it is unfavorable to supply intermediate embroidery data to the domestic embroidery-sewing machine as data on which the embroidery is based. This is because a lot of processing is required to convert the intermediate embroidery data to the embroidery seam data and, thus, the domestic embroidery-sewing machine, which is required to be low in price, would be overly expensive if it was provided with the function of executing such processing. Accordingly, the domestic embroidery-sewing machine is supplied with only embroidery seam data which are final data for embroidery and it is designed to perform embroidery according to the supplied embroidery seam data.

Like the industrial embroidery-sewing machine, plural embroidery patterns of different sizes are required for the same pattern when sewn by the domestic embroidery-sewing machine. For example, when the same pattern is embroidered on clothes of brothers of different ages and sizes, embroidery seam data for plural embroidery patterns differing in size are required for the same pattern. However, the data supplied to the domestic embroidery-sewing machine are the embroidery seam data as described above. Thus, the data cannot be enlarged or reduced because the embroidery seam data are stitch data for each stitch. Therefore, if embroidery seam data for different sizes are required, a series of operations from a read-out operation of reading an original picture pattern with an image scanner until an operation of preparing embroidery seam data must be repeated for every desired pattern size (i.e., the series of operations as described above must be repeated a number of times corresponding to the number of the desired different sizes). The repeated read-out work of the same pattern deteriorates the operational performance.

SUMMARY OF THE INVENTION

An object of the invention is to provide an embroidery data preparing device for collectively preparing embroidery seam data for plural embroidery patterns of different sizes by reading out an original picture pattern only once. That is, the original-picture pattern is read out only once. The read-out original picture pattern is converted to intermediate embroidery data. The intermediate embroidery data comprise outline data which are coordinate data and divided into plural blocks. The intermediate embroidery data can be enlarged or reduced because they are coordinate data. In an embroidery data preparing device of the invention, the intermediate embroidery data are initially enlarged or reduced to create the desired plurality of sizes prior to preparing a plurality of enlarged (or reduced) intermediate embroidery data, and the plurality of embroidery seam data are the prepared on the basis of the intermediate embroidery data.

In order to attain the above object, an embroidery data preparing device according to the invention, in which embroidery seam data are prepared on the basis of an original picture pattern having an original pattern for embroidery, includes original-picture data preparing means for reading out the original picture pattern to prepare original picture data of bit images, intermediate embroidery data preparing means for dividing the original data prepared by the original-picture data preparing means into plural closed areas to prepare intermediate embroidery data which are coordinate data defining the plural closed areas, intermediate embroidery data storing means for storing the intermediate embroidery data which are prepared by the intermediate embroidery data preparing means, size setting means for setting different pattern sizes, embroidery seam data preparing means for collectively preparing embroidery seam data for each stitch of every pattern size on the basis of the pattern sizes set by the size setting means and the intermediate embroidery data stored in the intermediate embroidery data storing means, and embroidery seam data storing means for storing embroidery seam data of different pattern sizes which are prepared by the embroidery seam data preparing means.

According to the embroidery data preparing device of the invention, the original picture data preparing means reads out the original picture pattern to prepare the original picture data as bit image data. The intermediate embroidery data preparing means divides the original picture data prepared by the original picture data preparing means into a plurality of closed areas to prepare the intermediate embroidery data of the coordinate data which define the plurality of closed areas. The intermediate embroidery data storing means stores therein the intermediate embroidery data thus prepared. The embroidery seam data preparing means collectively prepares the embroidery seam data for each stitch for the plurality of pattern sizes on the basis of the plural pattern sizes set in the size setting means and the intermediate embroidery data stored in the intermediate embroidery data storing means. The embroidery seam data of the plurality of pattern sizes which are prepared by the embroidery seam data preparing means are stored in the embroidery seam data storing means.

According to the embroidery data preparing device of the invention, the embroidery seam data of the plurality of different pattern sizes are collectively prepared and stored by reading out the original picture pattern only once. Therefore, it is unnecessary to read out an original picture pattern having the same pattern a plurality of times, to repetitively read out intermediate embroidery data and to individually set each of the different pattern sizes. Accordingly, the embroidery data preparing operation can be simplified and the operational performance and the embroidery data preparing efficiency can be improved.

BRIEF DESCRIPTION OF THE DRAWINGS

A preferred embodiment of the invention will be described in detail with reference to the following figures, wherein:

FIG. 3B is a table of labels for FIG. 3A;

DETAILED DESCRIPTION OF THE PREFERRED EMBODIMENT

A preferred embodiment according to the invention will be described hereunder with reference to the accompanying drawings. In the embodiment, any original picture pattern which is drawn by a user is read out to obtain original picture data of bit image data. Embroidery seam data, which are stitch data of each stitch used to embroider the pattern on an article are prepared on the basis of the original picture data of bit image.

Figure 1:
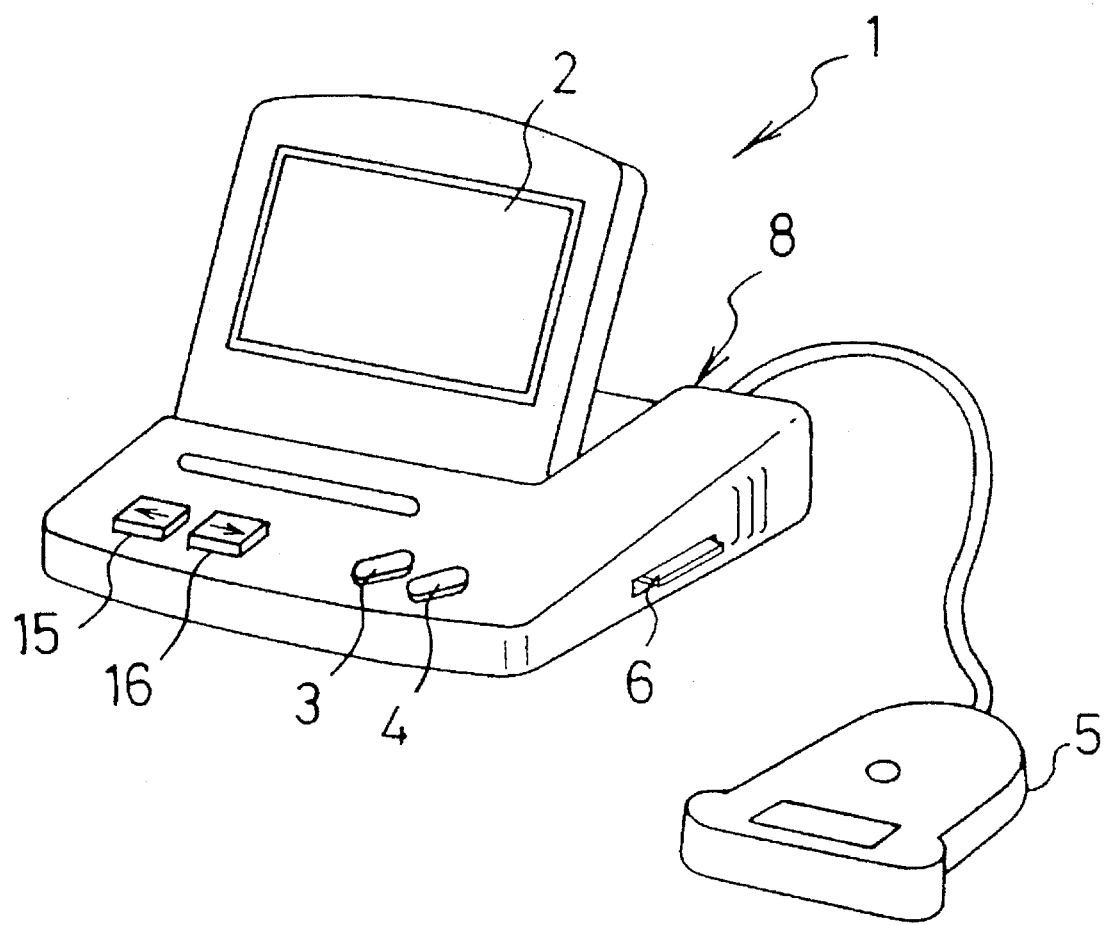
FIG. 1 is a perspective view of an embroidery data preparing device.

As shown in FIG. 1, the embroidery data preparing device 1 includes a liquid crystal display 2 for displaying characters and images, operation keys 3, 4 for starting a read-out operation of an original picture pattern 20 and image processing, cursor left and right shift keys 15, 16 for shifting a cursor to the left and the right respectively, a handy type white-and-black image scanner device 5 for reading out the original picture pattern, a flash memory device (FMD) 7 (FIG. 2) which comprises a non-volatile flash memory and in which a flash memory card 6 is detachably mounted, and a control body portion 8 which is connected to the above elements. An input port 17 and an output port 18 (FIG. 2) are provided in the rear of the control body portion 8.

The input port 17 is connected to a personal computer. The embroidery data preparing device 1 of this embodiment is designed so that it can also read out, from the personal computer connected to the input port 17, original picture data of bit image data which are prepared by the personal computer. On the other hand, the output port 18 is connected to an embroidery-sewing machine. Embroidery stitch data which are prepared in the embroidery data preparing device 1 are transmitted to the embroidery-sewing machine connected to the output port 18.

Figure 5:
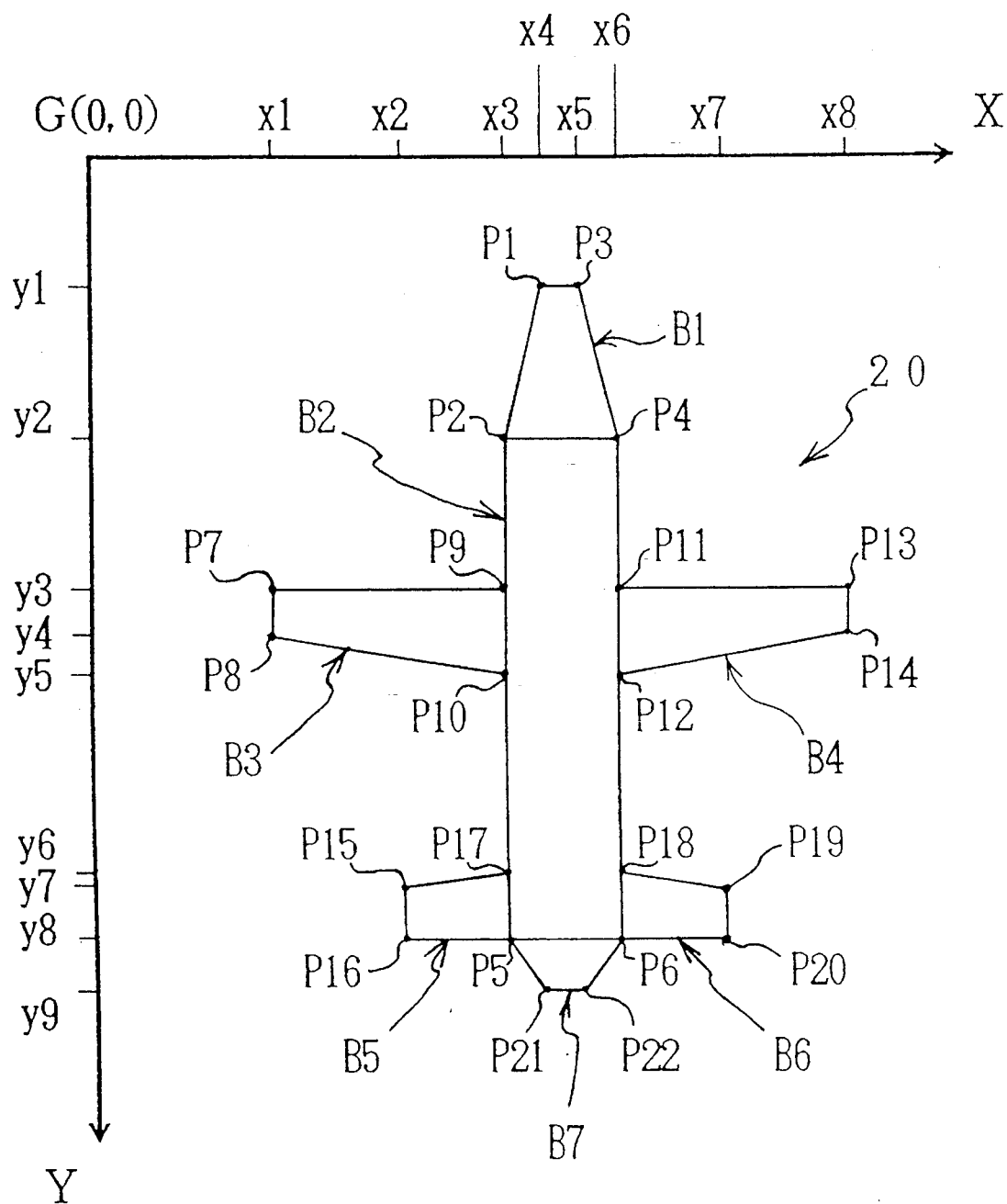
FIG. 5 is a diagram showing intermediate embroidery data at 100% magnifying power.

The image scanner device 5 is shifted along the upper surface of the original picture pattern 20 in a predetermined direction that is an auxiliary scanning direction or what would be considered as "down" the picture pattern, to convert the original picture pattern 20 to original picture data of bit image data for each pixel. An outline of a "plane" pattern, as illustrated in FIG. 5, is an example of the original picture pattern 20 which is read out by the image scanner device 5.

Figure 2:
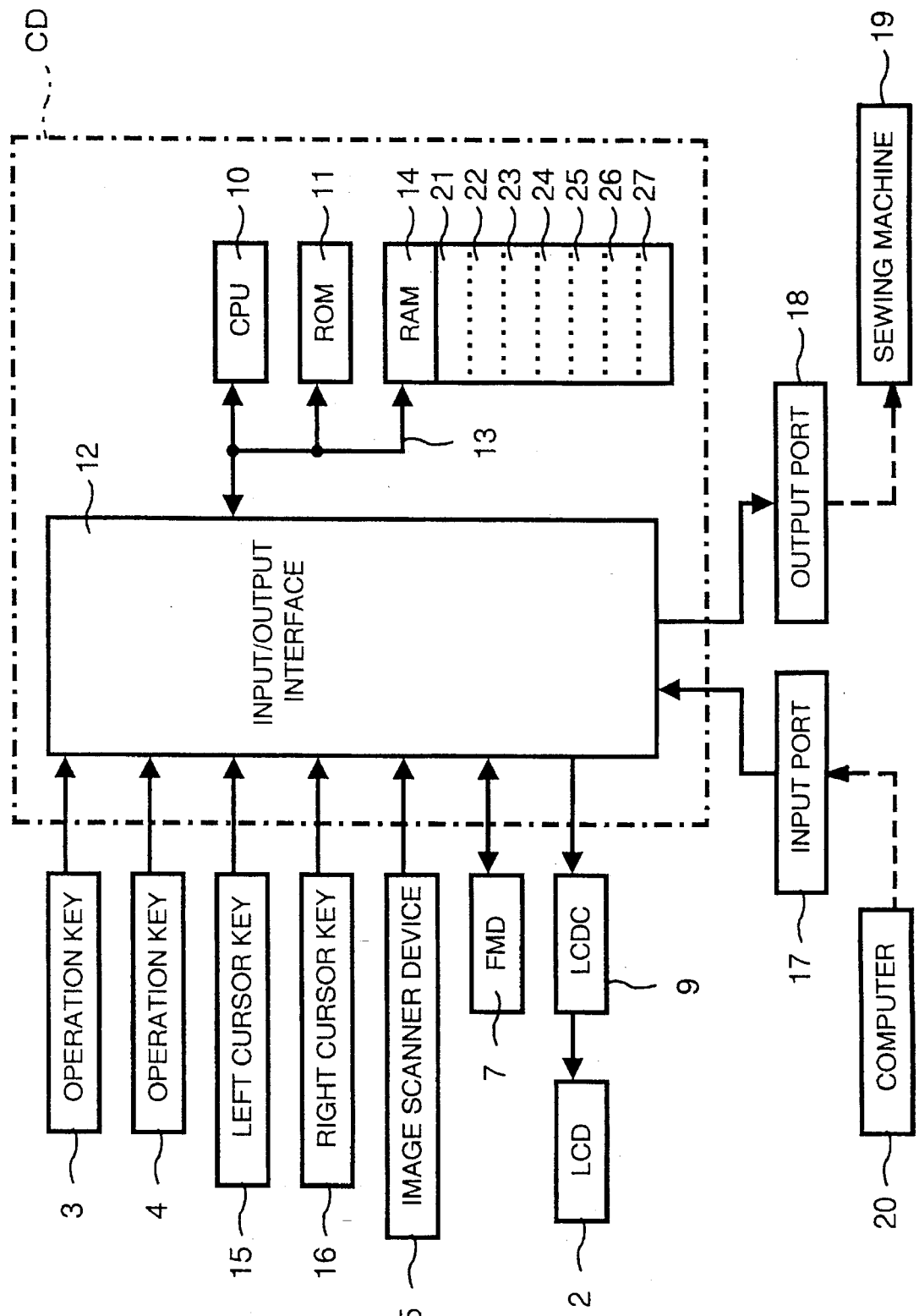
FIG. 2 is a block diagram of a control system for the embroidery data preparing device.

A control system for the embroidery data preparing device 1 is structured as shown in the block diagram of FIG. 2. A control device CD is built in the control body portion 8. An input/output interface 12 of the control device CD is connected to the two operation keys 3, 4, the left and right cursor shift keys 15, 16, the image scanner device (FMD) 5, the flash memory device 7, a display controller (LCDC) 9 having a video RAM for outputting display data to the liquid crystal display (LCD) 2, the input port 17 and the output port 18.

The control device CD includes a CPU 10, the input/output interface 12 which is connected to the CPU 10 through a bus line 13 of a data bus and an address bus, a ROM 11 and a RAM 14.

The ROM 11 stores a display driving control program for controlling the display controller 9 on the basis of the read-out original picture data, a control program for performing an embroidery seam data preparing control which is inherent to the invention, and will be described later, and other control programs. The embroidery seam data preparing control program includes a control program for dividing the original picture pattern into a plurality of closed areas (blocks) comprising various figures, such as triangles and rectangles, on the basis of the original picture pattern to prepare intermediate embroidery data defining the plural blocks. The embroidery seam data preparing control for preparing the embroidery seam data from the intermediate embroidery data preparing control and the intermediate embroidery data is described in detail in U.S. Pat. No. 5,379,707, the contents of which are incorporated herein by reference.

The RAM 14 is provided with various types of memories, such as an original picture data memory 21, an outline data memory 22, an intermediate embroidery data memory 23, an embroidery seam data memory 24, a pattern size memory 25, a parameter memory 26, and a work memory 27. In the original picture data memory 21 are stored the original picture data of bit image data to which the original picture pattern 20 is read out and converted by the image scanner device 5 and in the outline data memory 22 are stored outline data which are prepared on the basis of the original picture data and comprise coordinate data. Further, in the intermediate embroidery data memory 23 are stored intermediate embroidery data of coordinate data which are obtained by dividing the outline data into a plurality of closed areas (blocks) and in the embroidery seam data memory 24 are stored embroidery seam data for each stitch with which the original picture pattern is actually embroidered on an article. The pattern size memory 25 stores the pattern size values which are set by the user. When there are plural pattern size values thus set, these values are stored in order in the pattern size memory 25. A parameter memory 26 is provided for temporarily storing the pattern size value MS to be used and the embroidery block pointer value BP. A work memory 27 temporarily stores operation results obtained in the CPU and other working data.

Figure 3A:
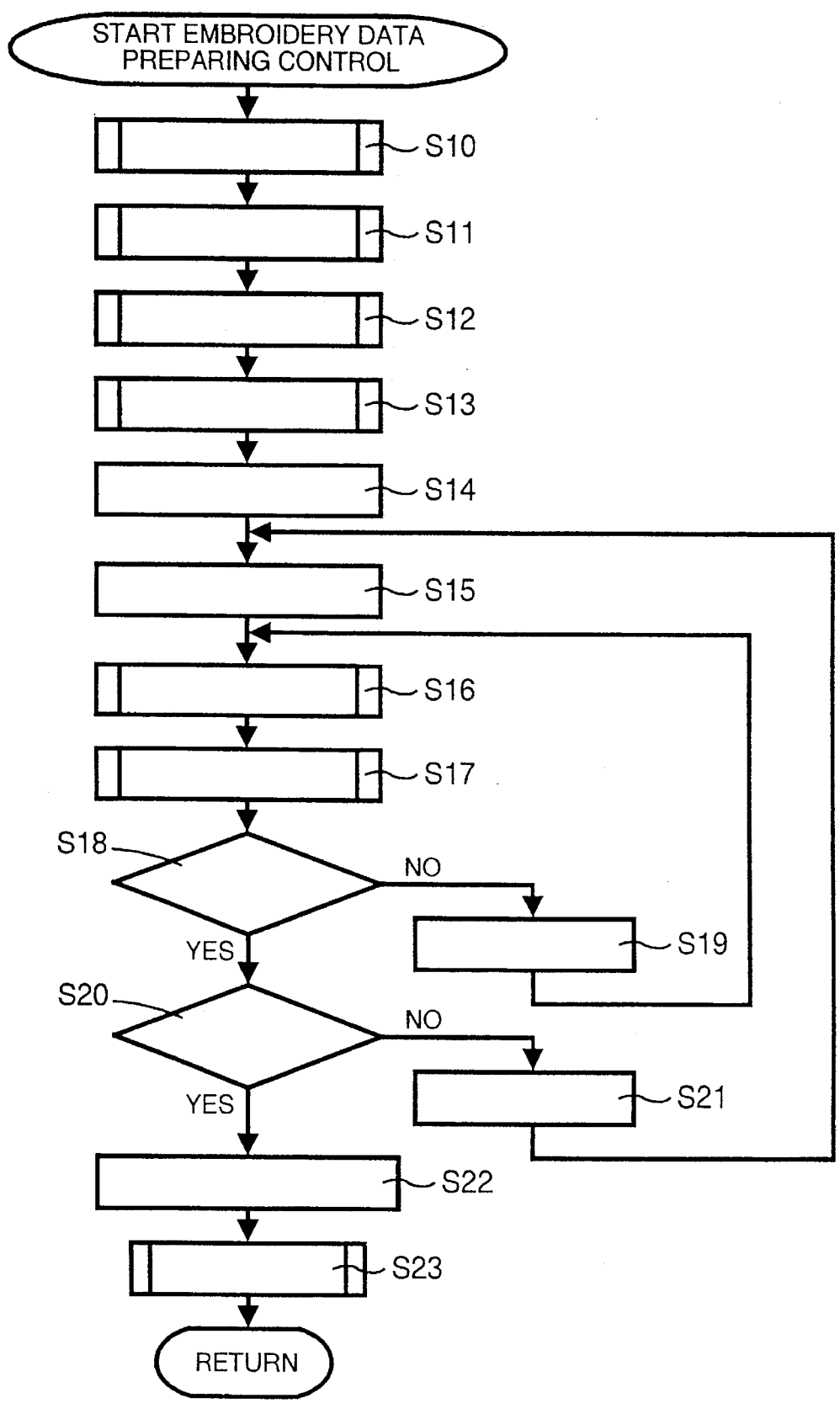
FIG. 3A is a flowchart for an embroidery data preparing control routine.

The embroidery data preparing control is executed in the control device CD of the embroidery data preparing device 1 as described with reference to FIGS. 3A and 3B. In FIGS. 3A and 3B, reference characters Si (i=10, 11, 12, . . . ) represent each step.

Upon manipulation of the operation key 3, the embroidery data preparing control is started. First, a pattern size setting processing for setting a pattern size is executed (step S10). In the pattern size setting processing, a pattern size setting frame (FIG. 4) is displayed on the liquid crystal display 2. Displayed on the frame are nine kinds of pattern size names 40, such as "400%" 41, "200%" 42, "100%" 43, "70%" 44, "50%" 45, "two sizes (100%, 50%)" 46, "three sizes (100%, 70%, 50%)" 47,"three sizes (200%, 100%, 50%)" 48, and "any enlargement/reduction magnifying power%" 49. The user selects and sets the desired pattern size name 40 from the available pattern size names 40.

The setting is performed as follows. First, the cursor K is shifted by pressing one of the cursor left or the cursor right shift keys 15, 16 to select the desired pattern size name 40. Thereafter, the selected pattern size name 40 is set by pushing the operation key 4. When the pattern size name 40 is set, the value of the pattern size indicated by the selected pattern size name 40 is stored in the pattern size memory 25. When a plurality of pattern sizes are contained in the selected pattern size name 40, the values of the plurality of pattern sizes are stored in order into the pattern size memory 25.

If the pattern size name "any enlargement/reduction magnifying power%" 49 is selected, it operates as follows. When the cursor right and left keys 15, 16 are operated, the cursor K is not shifted to the pattern size name "any enlargement/reduction magnifying power%" 49, the cursor K is only allowed to shift between the other pattern size names 41 to 48. The cursor K is shifted to the pattern size name "any enlargement/reduction magnifying power%" by pushing the operation key 3. However, it is obvious that alternatively right and then left keys 15, 16 can be used to shift the "any enlargement/reduction magnifying power %" and then setting of the size of enlargement reduction would proceed as described below.

When the cursor K is shifted to select the pattern size name "any enlargement/reduction magnifying power%", the magnifying power of enlargement or reduction is set by the user. This setting is performed by operating the cursor left and right shift keys 15, 16. "100%" is indicated as an initial value (default value) on the pattern size name "any enlargement/reduction magnifying power(%)" 49. As the cursor left shift key 15 is pushed, the value of the enlargement/reduction magnifying power which is displayed on the pattern size name "any enlargement/reduction magnifying power(%)" 49 is incremented by 1% every pushing operation. On the other hand, as the cursor right shift key 16 is pushed, the value of the enlargement/reduction magnifying power is decremented by 1% every pushing operation. After a desired enlargement/reduction magnifying power is selected by pushing the cursor left or right shift key 15, 16, the operation key 4 is pushed to store the value of the selected pattern size displayed on the pattern size name 49 into the pattern size memory 25.

When the operation key 3 is pushed again or, alternatively, one of the cursor left or right shift keys 15, 16 is pushed, during the setting operation of the pattern size name "any enlargement/reduction magnifying power(%)" 49, the cursor K is shifted to the one of the pattern size names 41 to 48 at which it was located just before it was shifted to the pattern size name "any enlargement/reduction magnifying power(%)" 49. With this operation, the setting of any enlargement/reduction magnifying power(%) is ceased.

Figure 4:
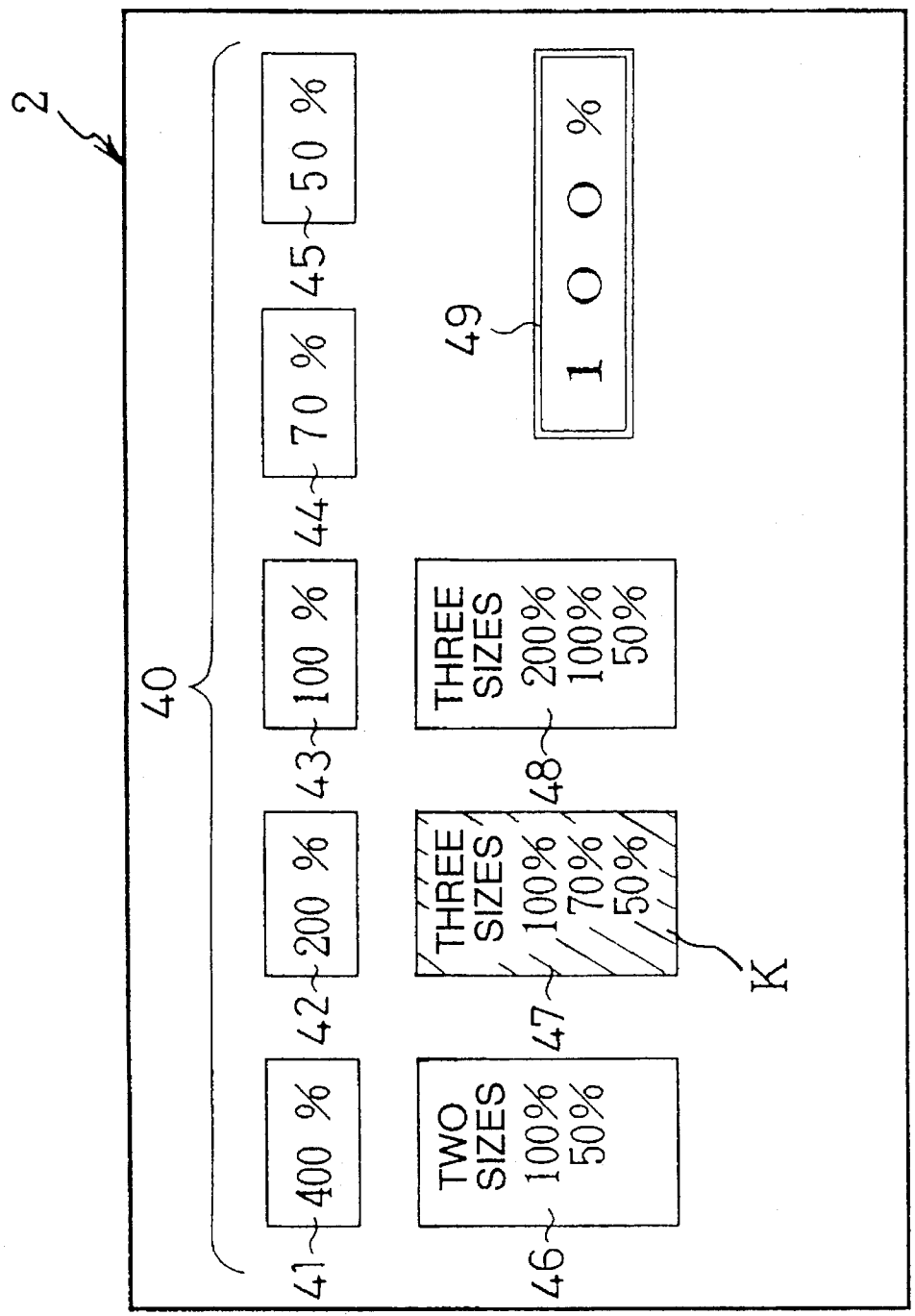
FIG. 4 is a diagram showing an example of a display on a pattern size setting frame.

FIG. 4 shows a state where the pattern size name "three sizes (100%, 70%, 50%)" 47 is selected from the pattern size names 40. When the operation key 4 is pushed in the above state, the pattern size name "three sizes (100%, 70%, 50%)" 47 is set. With this setting, the three pattern size values on the pattern size name 47 are stored in order into the pattern size memory 25. Subsequently, the original picture data input processing is executed (step S11). In this processing, the image scanner device 5 is successively shifted from a read-out start position of the original picture pattern 20 having the original picture drawn thereon to read out of the original image pattern 20. The read-out original picture pattern 20 is converted to the original picture data of bit image data, and then stored in the original picture data memory 21.

Subsequently, the outline data preparing processing is executed (step S12). In this processing, the outline of the original picture pattern 20 is obtained on the basis of the original picture data stored in the original picture data memory 21. The obtained outline is stored as the outline data comprising coordinate data into the outline data memory 22. A well-known boundary-line tracing algorithm is used as the method of obtaining the outline. In the boundary-line tracing algorithm, a 4-link or 8-link judgment processing is used to judge linkage of the outline.

Subsequently, the intermediate embroidery data preparing processing is executed (step S13). In this processing, the outline data which are stored in the outline data memory 22 are divided into plural closed areas comprising various continuous figures, such as triangles and rectangles, to prepare intermediate embroidery data. The intermediate embroidery data are stored in the intermediate embroidery data memory 23. This processing will be described in more detail using the outline data of the original picture pattern 20, obtained in the step S12, on an XY-coordinate system having its original G(0,0) as shown in FIG. 5. The outline data is divided into seven embroidery blocks B1 to B7 through the processing of the step S13 to obtain embroidery data of each of the embroidery blocks B1 to B7. That is, intermediate embroidery data comprising four coordinate values which serve as definition points P1 (x4, y1) to P4 (x6, y2) for the embroidery block B1 are obtained. For the embroidery block B2, the intermediate embroidery data comprises four coordinate values of definition points P2, P5, P6 and P4. Likewise, intermediate embroidery data for each of the other blocks of B3 to B7 are obtained. The intermediate embroidery data of the embroidery blocks B1 to B7 are successively stored in order into the intermediate embroidery data memory 23.

Thereafter, the first pattern size value of the plurality of pattern size values stored in the pattern size memory 25 is set to a pattern size value MS (step S14). Furthermore, the head address of the intermediate embroidery data at the head of the plurality of intermediate embroidery data scored in the intermediate embroidery data memory 23 is set to an embroidery block pointer value BP (step S15). Thereafter, an enlargement processing for enlarging the intermediate embroidery data indicated by the embroidery block pointer BP at the magnifying power corresponding to the pattern size value MS is executed (step S16). Like the outline data, the intermediate embroidery data comprise coordinate data, so that these data can be enlarged or reduced. Subsequently, the embroidery seam data preparing processing is then executed on the basis of the intermediate embroidery data which are indicated by the embroidery block pointer value BP and enlarged at the MS magnification (step S17). The embroidery seam data preparing processing prepares embroidery seam data which are stitch data of each stitch and the embroidery seam data formed in this processing is stored in the embroidery seam data memory 24.

If the intermediate embroidery seam data indicated by the embroidery block pointer value BP is not the last intermediate embroidery (S18: No), the head address of next intermediate embroidery data is set to the embroidery block pointer value BP (step S19). Then, the process returns to the step S16 to repetitively execute steps S16 to S19.

If the intermediate embroidery data indicated by the embroidery block pointer value BP are the last intermediate embroidery block data (S18: Yes), it is judged whether the pattern size value indicated by the pattern size value MS is the last pattern size value (step S20). If the pattern size value indicated by the pattern size value MS is judged not to be the last one (S20: No), the next pattern size value is set to the pattern size value MS (step S21). Then, the process returns to the step S15 to repetitively execute steps S15 to S19. If the pattern size value indicated by the pattern size value MS is judged to be the last value of the values stored in the pattern size memory 25 (S20: Yes), all the embroidery seam data which are set by the operator in the step S10 have been completed and all of the completed embroidery seam data are stored in the embroidery seam data memory 24. The embroidery seam data stored in the embroidery seam data are then stored into the flash memory card 6 through the flash memory device 7 (step S22).

Figure 6:
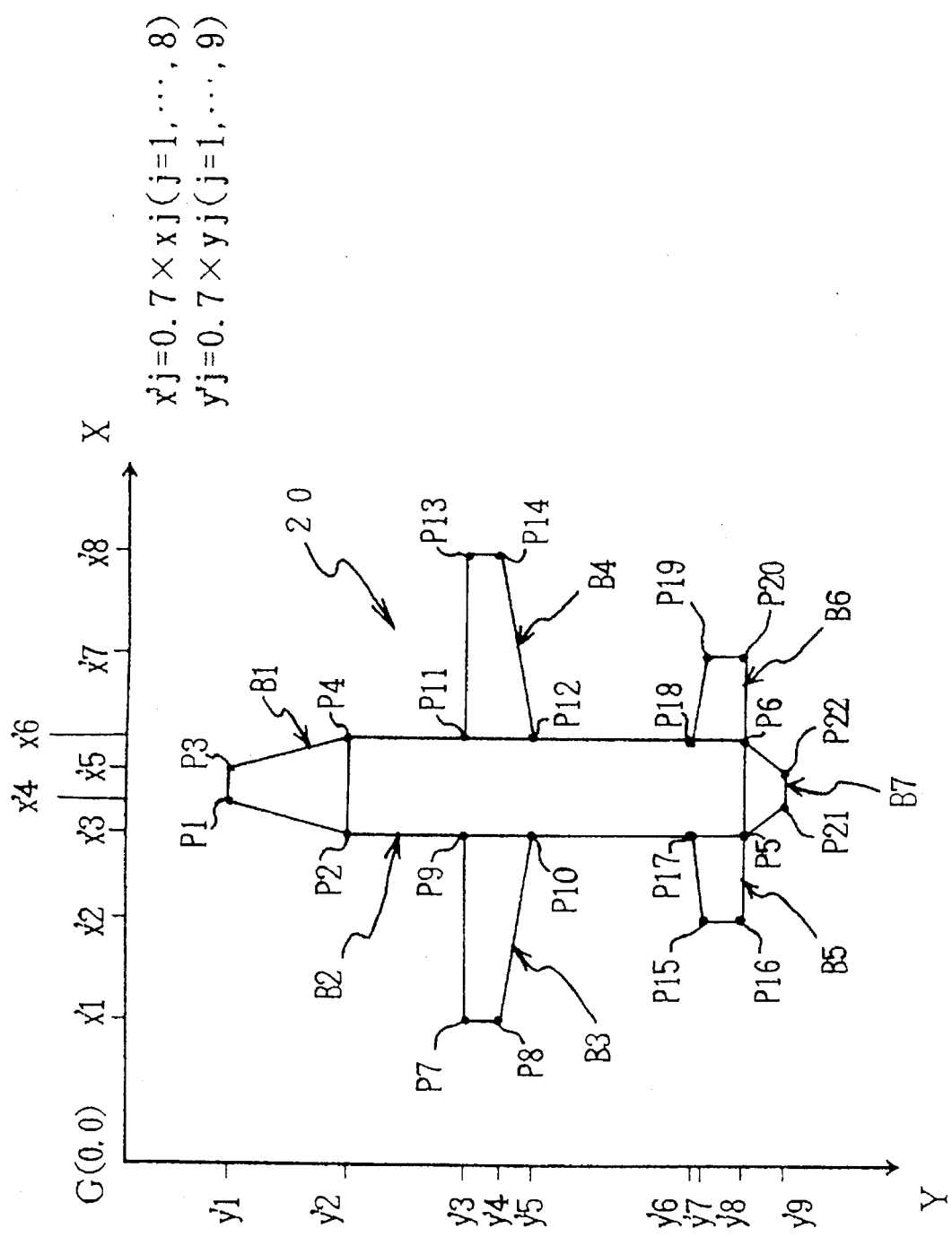
FIG. 6 is a diagram showing intermediate embroidery data at 70% magnifying power.
Figure 7:
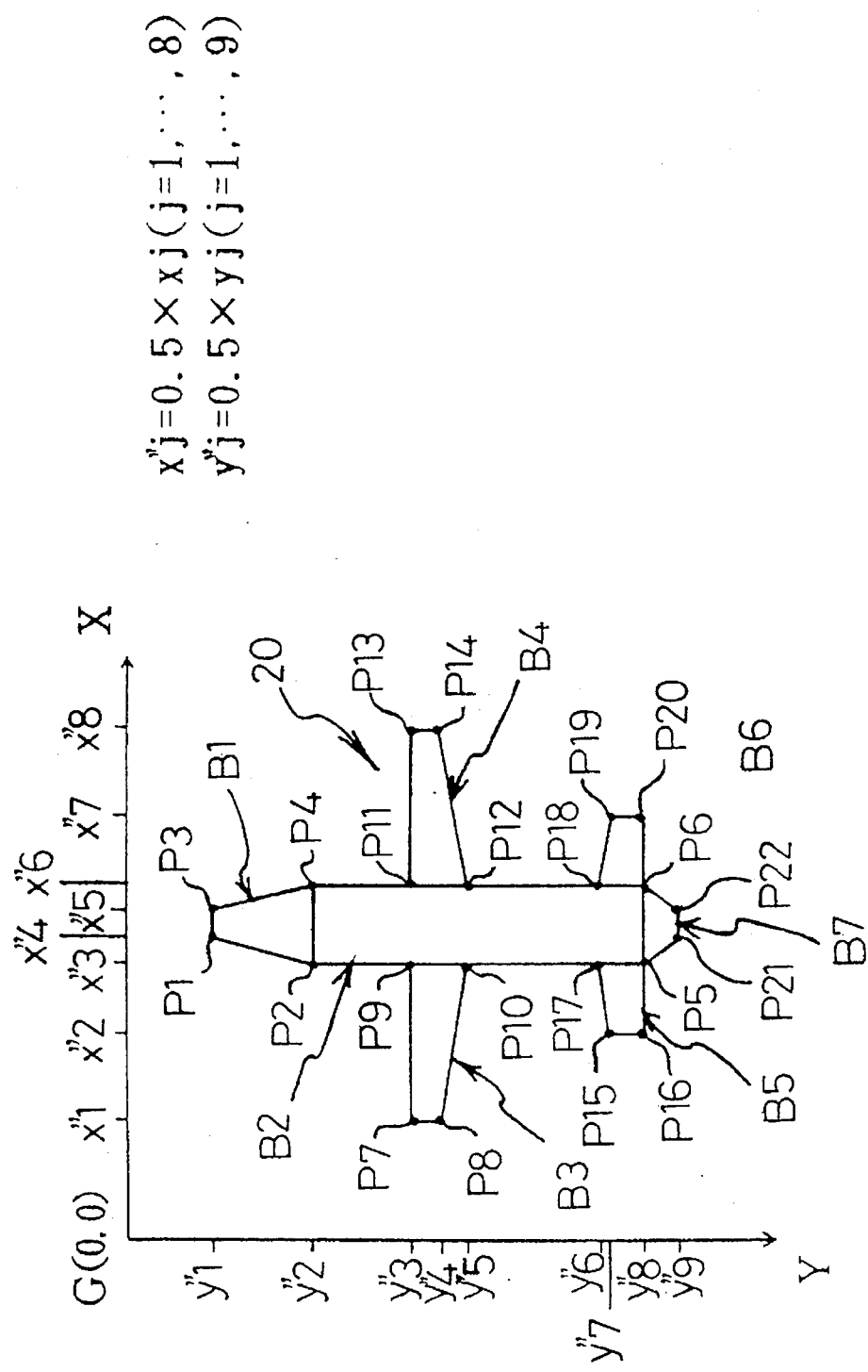
FIG. 7 is a diagram showing intermediate embroidery data at 50% magnifying power.

It is now assumed that the pattern size name "three sizes (100%, 70%, 50%)" is set in the processing of the step S10. In this case, the enlargement/reduction magnifying power of three pattern sizes "100%, 70%, 50%" are stored in the pattern size memory 25. First, the intermediate embroidery data of each of the embroidery blocks B1 to B7 stored in the intermediate embroidery data memory 23 are enlarged at 100% magnifying power on the basis of the first enlargement/reduction magnifying power "100%". The intermediate embroidery data enlarged at 100% magnifying power correspond to the intermediate embroidery data as shown in FIG. 5, the embroidery seam data are prepared on the basis of these data, and stored in the embroidery seam data memory 24. Subsequently, the intermediate embroidery data of each of the embroidery blocks B1 to B7 stored in the intermediate embroidery data memory is enlarged at 70% magnifying power on the basis of the second enlargement/reduction magnifying power "70%". The 70%-enlarged intermediate embroidery data correspond to intermediate embroidery data as shown in FIG. 6, and the coordinate values of the respective definition points P1 to P22 are respectively enlarged 0.7 times the original picture pattern, that is, they are appropriately reduced. The embroidery seam data are prepared on the basis of the reduced data and stored in the embroidery seam data memory 24. Then, the intermediate embroidery data of each of the embroidery blocks B1 to B7 stored in the intermediate embroidery data memory is enlarged at 50% magnifying power on the basis of the third enlargement/reduction magnifying power "50%". The 50%-enlarged intermediate embroidery data correspond to intermediate embroidery data as shown in FIG. 7, and the coordinate values of the respective definition points P1 to P22 are respectively enlarged 0.5 times the original picture pattern, that is, they are appropriately reduced. The embroidery seam data are then prepared on the basis of the reduced data and stored in the embroidery seam data memory 24.

When all the embroidery seam data of the plurality of pattern sizes are prepared and stored in the flash memory card 6 (step S22), editing processing of partially altering or correcting the embroidery seam data is executed (step S23). In the editing processing of the embroidery seam data stored in the flash memory card 6, the embroidery seam data of a desired pattern size which an operator wants to edit are displayed on the liquid crystal display 2. The alteration or correction is performed on the display frame of the liquid crystal display 2. The embroidery seam data, after being edited, are stored in the flash memory card 6.

Figure 8:
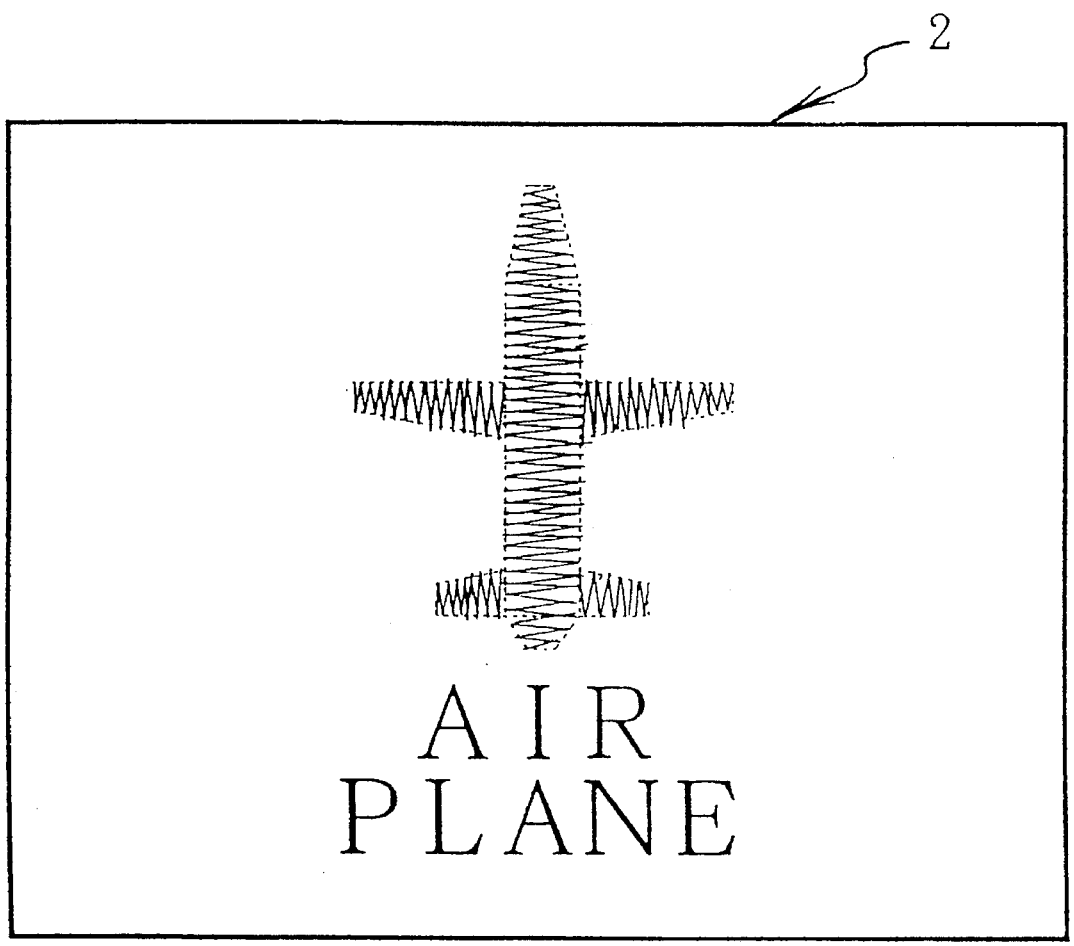
FIG. 8 is a diagram showing an embroidery pattern which comprises combination of embroidery seam data at 50% magnifying power and embroidery seam data of character arrays.

It is now assumed that the 50%-enlarged embroidery seam data are edited as shown in FIG. 8. The "50%" embroidery seam data are read in from the flash memory card 6, by an operator's instruction, and displayed on the liquid crystal display 2. By further operator's instruction in editing processing, the embroidery seam data is combined with embroidery seam data of the alphabetical character array "AIR PLANE" stored in the ROM 11. The finally edited embroidery seam data are then again stored in the flash memory card 6.

After the editing processing (S23), the CPU 10 finishes the embroidery data preparing control of FIG. 3 and returns the process to the main routine. The embroidery seam data which are stored in the flash memory card 6 are supplied to the embroidery-sewing machine when the flash memory card 6 is mounted in the embroidery-sewing machine. Furthermore, the embroidery seam data stored in the flash memory card 6 may be read out to supply the read-out embroidery seam data from the output port 18 of the embroidery data preparing device 1 to the embroidery-sewing machine.

As described above, the embroidery data preparing device of this embodiment can perform the embroidery data preparation without complicated operations, such as a repetitive read-out operation of intermediate embroidery data for the operation of individually setting a plurality of different pattern sizes at different times. Further, by reading out the original picture pattern only once, the embroidery seam data of the plurality of different pattern sizes can be collectively prepared simply and rapidly.

In general, a plurality of embroidery patterns of different sizes are required for the same pattern of embroidery in accordance with the embroidery position or the size of the article being embroidered. Therefore, the embroidery data preparing device 1 of this embodiment, in which the embroidery seam data of the plurality of different sizes can be collectively prepared, is extremely practical. For example, in a case where various patterns are combined with one another to form an original pattern for embroidery, if only 100%-size embroidery seam data can be obtained, it could occur when the embroidery pattern is either larger or smaller than what is needed. However, according to the embroidery data preparing device 1 of this embodiment, various embroidery seam data of a plurality of embroidery patterns of different sizes can be prepared ahead of time for the same pattern. Therefore, such a pattern combination work as described above can be smoothly performed.

Furthermore, the pattern size name 40 is provided with the "any enlargement/reduction magnifying power (%)" 49, so that any desired pattern size can be set. Therefore, any pattern size such as "120%" or "78%" which are not defined beforehand, can be simply set.

The invention is not limited to the embodiment as described above, and various modifications may be made to the control of this embodiment on the basis of existing techniques and other techniques which are obvious to skilled persons in the art without departing from the subject matter of the invention.

For example, for the setting of the pattern size name "any enlargement/reduction magnifying power(%)" 49, only one enlargement/reduction magnifying power can be set in this embodiment, however, the present invention may be designed so that plural magnifying powers can be also set in the pattern size name "any enlargement/reduction magnifying power(%)" 49.

Furthermore, the read-out of the original picture pattern 20 is performed using an image scanner device 5 in the embodiment as described above. However, it may be performed with a digitizer or a mouse. In this case, each point of the original picture pattern 20 is indicated by the digitizer or the mouse. The indicated points are linked to be continuous, whereby the continuous linkage is read out as the original picture pattern 20. In addition, the input port 17 may be connected to a personal computer to read the original picture data of the original picture pattern 20 from the personal computer into the embroidery data preparing device 1. Still further, the original picture data of the original picture pattern 20 may be stored in the flash memory card 6 to read out the original picture data from the flash memory device 7.

What is claimed is:

1. An embroidery data preparing device for preparing embroidery seam data from an original picture pattern having an original picture for an embroidery pattern, including:

original-picture data preparing means for reading out the original picture pattern to prepare original picture data of bit image data;

intermediate embroidery data preparing means for dividing the original picture data prepared by said original-picture data preparing means into a plurality of closed areas to prepare intermediate embroidery data comprising coordinate data which define the plurality of closed areas;

intermediate embroidery data storing means for storing the intermediate embroidery data which are prepared by said intermediate embroidery data preparing means;

size setting means for setting a plurality of different pattern sizes;

embroidery seam data preparing means for collectively preparing a set of embroidery seam data for each stitch of every pattern size on the basis of the plurality of pattern sizes set by said size setting means and the intermediate embroidery data stored in said intermediate embroidery data storing means; and embroidery seam data storing means for storing each set of embroidery seam data for each pattern size of the plurality of different pattern sizes which are prepared by said embroidery seam data preparing means.

2. The embroidery data preparing device according to claim 1, wherein said embroidery seam data preparing means includes enlarging/reducing means for enlarging or reducing the intermediate embroidery data stored in said intermediate embroidery data storing means for every pattern size of the plurality of pattern sizes set by said size setting means, and stitch data preparing means for preparing embroidery seam data for each stitch on the basis of the enlarged or reduced intermediate embroidery data from said enlarging/reducing means.

3. The embroidery data preparing device according to claim 1, wherein said intermediate embroidery data preparing means includes outline data preparing means for extracting an outline from the original picture data prepared by said original picture data preparing means to prepare outline data comprising coordinate data, and closed area data preparing means for dividing the outline data prepared by said outline data preparing means into the plurality of closed areas to prepare the intermediate embroidery data.

4. The embroidery data preparing device according to claim 1, wherein said size setting means sets a pattern size with a magnifying power for enlargement or reduction.

5. The embroidery data preparing device according to claim 1, wherein said original-picture data preparing means comprises a scanning device.

6. The embroidery data preparing device according to claim 1, further comprising an input port, wherein said original-picture data preparing means comprises a computer connected to the embroidery data preparing device through said input port.

7. The embroidery data preparing device according to claim 1, further comprising an output port, wherein the embroidery data preparing device is connected to a sewing machine through said output port.

8. The embroidery data preparing device according to claim 1, wherein said embroidery seam data storing means comprises a long term storage medium.

9. An embroidery data preparing device for preparing embroidery data of an original pattern for use by an embroidery machine, comprising:

means for inputting an original pattern;

dividing means for dividing the input original pattern into a plurality of closed embroidery areas;

size setting means for setting at least one pattern size;

stitch data preparing means for preparing a set of stitch data for each of the plurality of closed embroidery areas for each size pattern defined by said size setting means; and stitch data storing means for storing the set of stitch data for each size pattern as prepared by said stitch data preparing means.

10. The embroidery data preparing device according to claim 9, further comprising storage means having a plurality of storage areas for storing different types of data.

11. The embroidery data preparing device according to claim 10, further comprising intermediate embroidery data creation means for defining the plurality of closed embroidery areas as coordinate data.

12. The embroidery data preparing device according to claim 11, wherein said means for inputting an original pattern comprises an image scanner.

13. The embroidery data preparing device according to claim 11, further comprising an input port, wherein said means for inputting an original pattern comprises a computer attached to said input port of the embroidery data preparing device.

14. The embroidery data preparing device according to claim 11, wherein said means for inputting an original pattern comprises a one of a digitizer and a mouse for indicating outline points of an original picture, the outline points when connected to be continuous reflecting the original picture.

15. The embroidery data preparing device according to claim 11, wherein said stitch data preparing means has an enlarging/reducing means for enlarging or reducing the coordinate data appropriately for each pattern size, and a stitch defining means for preparing the stitch data on the basis of the enlarged/reduced coordinate data.

16. The embroidery data preparing device according to claim 11, wherein said means for inputting an original pattern includes means for preparing outline data for use by said dividing means.

17. The embroidery data preparing device according to claim 11, wherein said size setting means permits a selection from a group of sizes comprising a plurality of single sizes consisting of predetermined enlargement/reduction ratios and a plurality of multiple sizes each consisting of at least two predetermined enlargement/reduction ratios.

18. The embroidery data preparing device according to claim 17, wherein said size setting means further comprises means for selectively setting at least one enlargement/reduction ratio to define a pattern size.

19. The embroidery data preparing device according to claim 11, wherein said storage means comprises a removable storage medium.

20. The embroidery data preparing device according to claim 9, further comprising an output port, wherein said embroidery data preparing device is connected to a sewing machine through said output port.

* * * * *